US012608098B2

(12) United States Patent
Fan et al.

(10) Patent No.: US 12,608,098 B2
(45) Date of Patent: Apr. 21, 2026

(54) DRIVING DEVICE AND METHOD FOR GENERATING DRIVING VOLTAGE

(71) Applicant: ILI TECHNOLOGY CORP., Hsinchu County (TW)

(72) Inventors: Chuan-Chi Fan, Hsinchu County (TW); Jung-Kuei Hsu, Hsinchu County (TW); Yung-Fu Lin, Hsinchu County (TW); Wen-Ger Wong, Hsinchu County (TW); Chia-Chun Hsu, Hsinchu County (TW); Cheng-Chung Hsu, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 51 days.

(21) Appl. No.: 18/946,864

(22) Filed: Nov. 13, 2024

(65) Prior Publication Data

US 2025/0231635 A1     Jul. 17, 2025

(30) Foreign Application Priority Data

Jan. 11, 2024     (TW) ................................. 113101175

(51) Int. Cl.
*G06F 3/041* (2006.01)
*H02M 3/07* (2006.01)
(52) U.S. Cl.
CPC .......... *G06F 3/0416* (2013.01); *H02M 3/073* (2013.01); *H02M 3/071* (2021.05)
(58) Field of Classification Search
CPC ..... G06F 3/0416; H02M 3/073; H02M 3/071; H02M 3/07
See application file for complete search history.

(56) References Cited

U.S. PATENT DOCUMENTS

| | | | |
|---|---|---|---|
| 4,561,002 A | 12/1985 | Chiu | |
| 9,024,913 B1 | 5/2015 | Jung et al. | |
| 10,331,266 B2 * | 6/2019 | Shin | G06F 3/0412 |
| 11,675,459 B1 * | 6/2023 | Kang | G06F 3/04184 |
| | | | 345/174 |
| 11,880,533 B1 * | 1/2024 | Chen | H02M 3/158 |

(Continued)

FOREIGN PATENT DOCUMENTS

| | | |
|---|---|---|
| CN | 103425317 | 12/2013 |
| CN | 102402330 | 3/2015 |

(Continued)

OTHER PUBLICATIONS

"Office Action of Taiwan Counterpart Application", issued on Dec. 2, 2024, p. 1-p. 4.

(Continued)

*Primary Examiner* — Ibrahim A Khan
(74) *Attorney, Agent, or Firm* — JCIPRNET

(57) ABSTRACT

A driving device and a method for generating a driving voltage are provided. The method for generating the driving voltage is applicable to a driving device of a touch panel. The method includes: generating multiple different reference voltages; providing a voltage selector to select and output each of the reference voltages in each of multiple time intervals to generate a driving voltage; and setting a time length for each of the time intervals according to whether a signal power of the driving device is greater than a set value.

16 Claims, 4 Drawing Sheets

(56) References Cited

U.S. PATENT DOCUMENTS

| | | | | |
|---|---|---|---|---|
| 2009/0167325 A1* | 7/2009 | Geaghan | ............. | G06F 3/04166 |
| | | | | 324/660 |
| 2010/0033413 A1* | 2/2010 | Song | .................... | G09G 3/3655 |
| | | | | 345/89 |
| 2010/0059295 A1* | 3/2010 | Hotelling | ............ | G06F 3/04166 |
| | | | | 178/18.06 |
| 2011/0001492 A1* | 1/2011 | Nys | ....................... | H03M 1/123 |
| | | | | 324/658 |
| 2013/0076648 A1* | 3/2013 | Krah | ................... | G06F 3/04164 |
| | | | | 345/173 |
| 2014/0104226 A1* | 4/2014 | Lee | ....................... | G06F 3/0446 |
| | | | | 345/174 |
| 2014/0139480 A1* | 5/2014 | Seo | ....................... | G06F 3/0443 |
| | | | | 345/174 |
| 2015/0002421 A1* | 1/2015 | Kim | ..................... | G06F 3/0416 |
| | | | | 345/173 |
| 2015/0091829 A1* | 4/2015 | Endo | ...................... | G11C 5/147 |
| | | | | 345/94 |

| | | | | |
|---|---|---|---|---|
| 2016/0210929 A1* | 7/2016 | Liu | ..................... | G06F 3/04184 |
| 2016/0334934 A1 | 11/2016 | Mo et al. | | |
| 2017/0052614 A1* | 2/2017 | Hsiao | ....................... | G09G 3/20 |
| 2018/0188846 A1 | 7/2018 | Srivastava et al. | | |
| 2020/0387250 A1 | 12/2020 | Hsiao et al. | | |
| 2022/0187940 A1 | 6/2022 | Hsiao et al. | | |

FOREIGN PATENT DOCUMENTS

| | | |
|---|---|---|
| JP | 2007503243 A | 2/2007 |
| KR | 20100019246 A | 2/2010 |
| TW | 201530401 | 8/2015 |
| TW | 201709037 | 3/2017 |
| TW | M613913 | 7/2021 |
| WO | 2016112781 | 7/2016 |

OTHER PUBLICATIONS

"Office Action of Korea counterpart Application", issued on Dec. 17, 2025, p. 1-p. 5.

* cited by examiner

Set a time interval to an initial value ——S610

——S620

Whether a signal power is greater than a set value          No

Yes

S630 ——

Increase a duration by one step value

S640 ——

Decrease the duration by one step value and end an action

DRIVING DEVICE AND METHOD FOR GENERATING DRIVING VOLTAGE

CROSS-REFERENCE TO RELATED APPLICATION

This application claims the priority benefit of Taiwan application serial no. 113101175, filed on Jan. 11, 2024. The entirety of the above-mentioned patent application is hereby incorporated by reference herein and made a part of this specification.

BACKGROUND

Technical Field

The disclosure provides a driving device and a method for generating a driving voltage, particularly relating to a driving device which may adjust the duration of a driving voltage according to the signal power of the driving device.

Description of Related Art

Based on the technological development trends in recent years, the thickness of touch panels on electronic devices is becoming increasingly thin, resulting in larger capacitive loads of the touch panels, which leads to an increase in the driving current of the touch panels, so that the power consumption required to drive the touch panels also is increased. How to effectively reduce the required power consumption for driving touch panels while maintaining the signal power within a set value range is an important issue for those skilled in the art.

SUMMARY

The disclosure provides a driving device and a method for generating a driving voltage, which can adjust the duration of the driving voltage according to the signal power of the driving device.

A method for generating a driving voltage of the disclosure is applicable to a driving device of a touch panel. The method for generating the driving voltage includes the following steps. Multiple different reference voltages are generated. A voltage selector is provided to select and output each reference voltage in each of multiple time intervals to generate the driving voltage. A duration of each of the time intervals is set according to whether a signal power of the driving device is greater than a set value.

A driving device of the disclosure is applicable for driving a touch panel. The driving device includes a reference voltage generator and a voltage selector. The reference voltage generator receives a benchmark voltage and provides multiple different reference voltages. The voltage selector is coupled to the reference voltage generator, receives the reference voltages, and selects and outputs each of the reference voltages in each of multiple time intervals to generate the driving voltage. The voltage selector sets the duration of each of the time intervals according to whether the signal power of the driving device is greater than a set value.

Based on the above, the driving device of the disclosure may, by adjusting the duration of the time intervals of the voltage selector, achieve the efficacy of reducing power consumption and maintaining good noise immunity while ensuring that the signal power of the driving device satisfies the set value range as much as possible.

DESCRIPTION OF THE EMBODIMENTS

Figure 1:
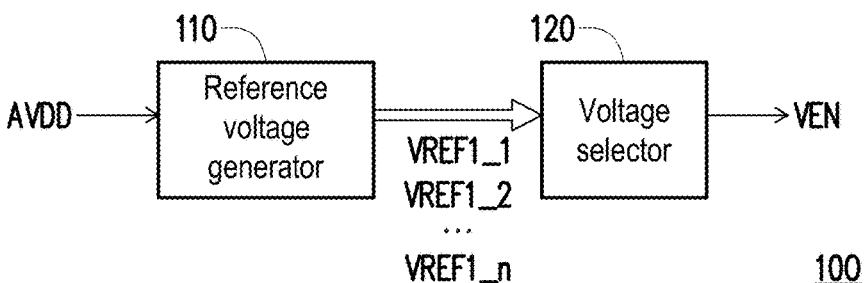
FIG. 1 illustrates a circuit diagram of a driving device according to an embodiment of the disclosure.

Referring to FIG. 1, FIG. 1 illustrates a circuit diagram of a driving device according to an embodiment of the disclosure. A driving device 100 includes a reference voltage generator 110 and a voltage selector 120. The output terminal of the reference voltage generator 110 is coupled to the voltage selector 120.

In this embodiment, the reference voltage generator 110 may receive a benchmark voltage AVDD, and output n reference voltages VREF1_1 to VREF1_$n$ according to the benchmark voltage AVDD. Each of the n reference voltages VREF1_1 to VREF1_$n$ has a different voltage value. In this embodiment, n may be any positive integer greater than 1.

The voltage selector 120 may receive the reference voltages VREF1_1 to VREF1_$n$, and in each of X time intervals, the voltage selector 120 may select and output one of the reference voltages VREF1_1 to VREF1_$n$ to generate a driving voltage VEN. It is worth mentioning that in this embodiment, X is equal to n minus 1 of this embodiment.

For example, taking the voltage values of the reference voltages VREF1_1 to VREF1_$n$ as a sequence arranged in ascending order, in the first phase, during the first time interval, the voltage selector 120 may choose to adjust the driving voltage VEN from the reference voltage VREF1_1 to the reference voltage VREF1_2. During the second time interval followed by the first time interval, the voltage selector 120 may choose to adjust the driving voltage VEN from the reference voltage VREF1_2 to the reference voltage VREF1_3. Following this pattern, during the Xth time interval, the voltage selector 120 may choose to adjust the driving voltage VEN from the reference voltage VREF1_$n$-1 to the reference voltage VREF1_$n$.

Subsequently, in the second phase, during the X+1th time interval, the voltage selector 120 may choose to adjust the driving voltage VEN from the reference voltage VREF1_$n$ to the reference voltage VREF1_$n$-1. Following this pattern, during the 2Xth time interval, the voltage selector 120 may choose to adjust the driving voltage VEN from the reference voltage VREF1_2 to the reference voltage VREF1_1.

Furthermore, the voltage selector 120 may stably provide the selected reference voltages VREF1_1 to VREF1_$n$ as the driving voltage VEN in each time interval. Regarding the duration of the aforementioned time intervals, the voltage selector 120 may set the duration based on the signal power of the driving device 100.

In other words, in this embodiment, the voltage waveform of the driving voltage VEN may be an ascending staircase shape in the first phase, and may be a descending staircase shape in the second phase.

Incidentally, the voltage values of the reference voltages VREF1_1 to VREF1_$n$ may form an arithmetic sequence. Alternatively, in other embodiments of the disclosure, the voltage difference between any two adjacent reference voltages may also be different, without any specific restriction.

The first phase and the second phase may both have X time intervals, and each of the time intervals in the first phase and the second phase may be equal to the same duration t_z.

If the duration t_z is greater than or equal to the charging and discharging time required for the driving voltage VEN on the corresponding touch panel, the duration t_z may cause the signal power of the driving device 100 to be too low, thereby reducing the noise immunity of the driving device 100. In this embodiment, the duration t_z is less than the charging and discharging time required for the driving voltage VEN on the corresponding touch panel, which may cause a slight increase in power consumption of the driving device 100, but may enable the driving device 100 to simultaneously possess reduced power consumption and good noise immunity. For example, taking the first phase as an example, if the time required for the driving voltage VEN to rise from the reference voltage VREF1_1 to the reference voltage VREF1_2 is T seconds, then the duration t_z of each of the first to Xth time intervals in the first phase is less than T seconds.

In this embodiment, the signal power of the driving device 100 may be related to the duration t_z. Therefore, by setting the duration t_z, the signal power required by the driving device 100 may be adjusted.

In this embodiment, the longer the duration t_z, the smaller the signal power of the driving device 100. The voltage selector 120 may detect the signal power of the driving device 100 and determine whether the signal power of the driving device 100 is greater than a set value. The voltage selector 120 may adjust the duration t_z according to the result of the aforementioned determination.

It is worth mentioning that the output power of the driving device is as shown in the following formula (1).

$$Pstep = \frac{1}{X} \cdot C \cdot Vp^2 \cdot \frac{1}{f(t\_z)}$$
formula (1)

In formula (1), Pstep is the output power of the driving device 100. X is the number of time intervals in the first phase. Vp is the voltage difference between the reference voltage VREF1_$n$ and the reference voltage VREF1_1. C is a capacitance value, and a capacitor with this capacitance value for receiving a power source with the output power. f is the frequency. t_z is the duration in this embodiment.

From formula (1), it may be seen that when Vp, C, and t_z are all fixed values, if the number of time intervals in the first phase is larger, that is, when X is larger, the output power of the driving device 100 is smaller.

Following the above, assuming a first situation where Vp, C, and t_z are all fixed values, X is set to 3, the voltage selector 120 provides the reference voltages VREF1_1 to VREF1_4, and the difference between the reference voltage VREF1_4 and the reference voltage VREF1_1 is equal to Vp. Further assuming a second situation where Vp, C, and t_z are the aforementioned fixed values, X is set to 1, the voltage selector 120 provides the reference voltages VREF1_1 to VREF1_2, and the difference between the reference voltage VREF1_2 and the reference voltage VREF1_1 is also equal to Vp. Comparing the first situation with the second situation, it may be seen that the output power in the first situation is only ⅓ of the output power in the second situation.

In the above situation, the power consumption of the driving device 100 may be reduced to ⅓, but the excessively long charging and discharging time may lead to the signal power of the driving device 100 being too low. This embodiment explains the relationship between adjusting the charging and discharging time, the power consumption, and the signal power. For example, if the charging time required for the driving voltage VEN to rise from the reference voltage VREF1_1 to 99.9% of the reference voltage VREF1_2 is T seconds, the power consumption is at the minimum, which is considered as the power consumption comparison baseline, and the signal power is 12.7 dB. Shortening the charging time only rises the reference voltage VREF1_1 to 86% of the reference voltage VREF1_2, and results in about 15.7% more power consumption according to the output power formula of the driving device, but improves the signal power to 14.81 dB, so that the driving device 100 may the efficacy of both reducing power consumption and good noise immunity.

Moreover, if shortening the charging time only rises the reference voltage VREF1_1 to 95% of the reference voltage VREF1_2, and results in about 5.2% more power consumption according to the output power formula of the driving device, but improves the signal power to 14.51 dB, the driving device 100 may have the efficacy of both reducing power consumption and good noise immunity.

It is worth mentioning that when the driving voltage VEN of the driving device 100 rises to the reference voltage VREF1_$n$, the driving device 100 may maintain for a preset duration, which keeps the voltage value of the driving voltage VEN at the highest voltage value of the reference voltages.

Figure 2:
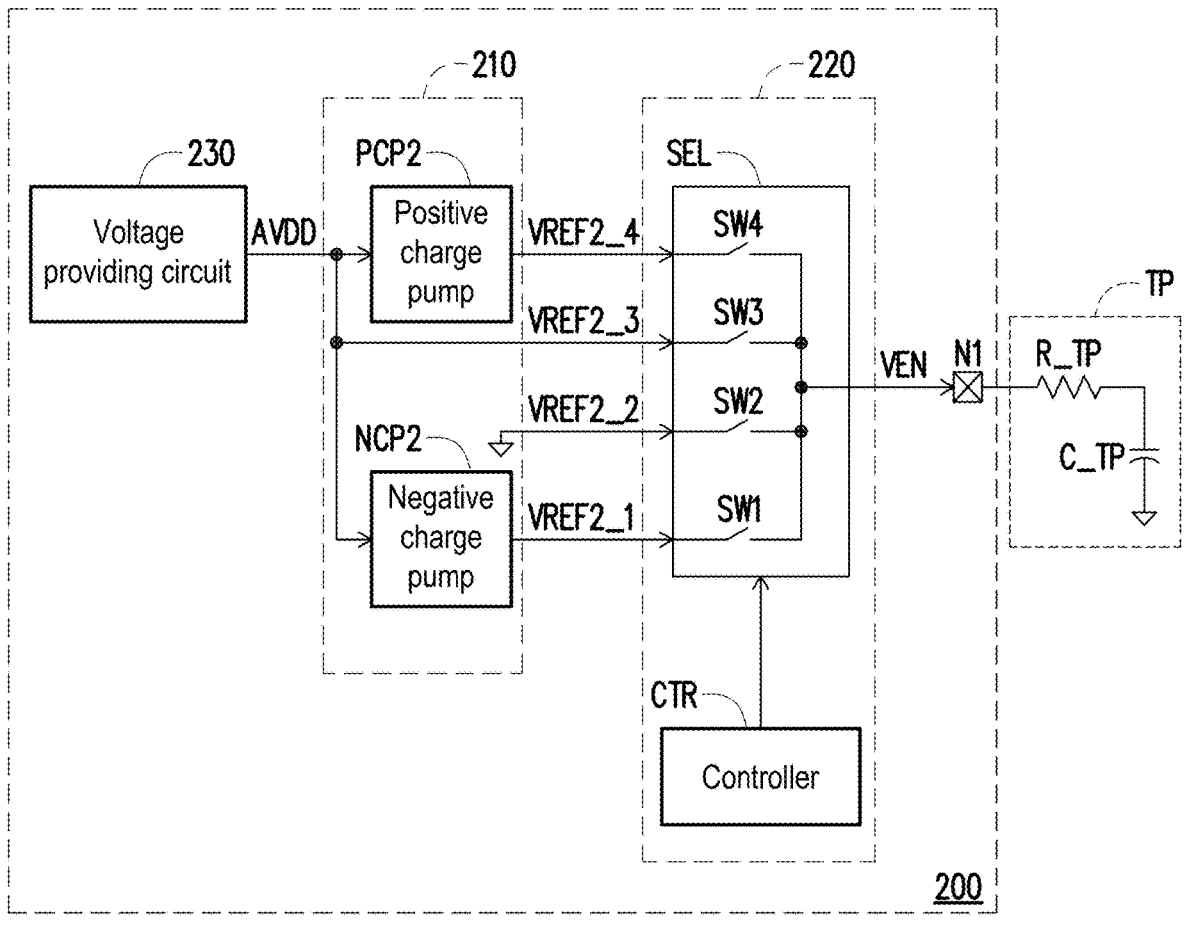
FIG. 2 illustrates a circuit diagram of a driving device according to an embodiment of the disclosure.

Referring to FIG. 2, FIG. 2 illustrates a circuit diagram of a driving device according to an embodiment of the disclosure. A driving device 200 includes a reference voltage generator 210, a voltage selector 220, and a voltage providing circuit 230. The input terminal of the reference voltage generator 210 is coupled to the voltage providing circuit 230, and multiple output terminals of the reference voltage generator 210 are coupled to multiple input terminals of the voltage selector 220. The output terminal of the voltage selector 220 is coupled to a touch panel TP by a node N1.

In this embodiment, the reference voltage generator 210 includes a positive charge pump PCP2 and a negative charge pump NCP2. The reference voltage generator 210 has four output terminals, which output reference voltages VREF2_1, VREF2_2, VREF2_3, and VREF2_4 respectively.

It is worth mentioning that the reference voltage generator 210 may receive a benchmark voltage AVDD from the voltage providing circuit 230. The negative charge pump NCP2 may generate an adjusted voltage with a voltage value of −1 times the benchmark voltage AVDD according to the benchmark voltage AVDD, and set the adjusted voltage as the reference voltage VREF2_1. The reference voltage VREF2_2 may be equal to the ground voltage. The reference voltage VREF2_3 may be equal to the benchmark voltage AVDD. The positive charge pump PCP2 may generate an adjusted voltage with a voltage value of 2 times the benchmark voltage AVDD according to the benchmark voltage AVDD, and set the adjusted voltage as the reference voltage VREF2_4.

In this embodiment, the voltage selector 220 includes a switch circuit SEL and a controller CTR. The switch circuit SEL has multiple switches, each of whom coupled to one of the multiple output terminals of the reference voltage generator 210, to receive multiple different reference voltages. In FIG. 2, the switch circuit SEL has switches SW1, SW2, SW3, and SW4, where the switch SW1 receives the reference voltage VREF2_1, the switch SW2 receives the reference voltage VREF2_2, the switch SW3 receives the reference voltage VREF2_3, and the switch SW4 receives the reference voltage VREF2_4. The controller CTR is coupled to the switch circuit SEL, and the controller CTR may control the conduction state of each switch in the switch circuit SEL, and select one of the reference voltages VREF2_1 to VREF2_4 in each of the time intervals to adjust the voltage value of the driving voltage VEN.

In this embodiment, the touch panel TP may receive the signal power of the driving device 200 from the node N1. According to the known technology possessed by those skilled in the art to which the disclosure pertains, it is known that both the resistance R_TP and capacitance C_TP of the touch panel TP may affect the set value of the driving device 200, thereby influencing the setting of the duration t_z.

In FIG. 2, the voltage providing circuit 230 may be a low-dropout regulator (LDO) or any form of voltage generation circuit. The reference voltage generator 210 may be a voltage multiplier circuit, or in other embodiment, the reference voltage generator 210 may be a voltage divider circuit. If the reference voltage generator 210 is a voltage divider circuit, the voltage value of each of the reference voltages VREF2_1 to VREF2_4 may be an arithmetic or non-arithmetic sequence not greater than the benchmark voltage AVDD. Taking the voltage values of the reference voltages VREF2_1 to VREF2_4 as an arithmetic sequence for example, the reference voltage VREF2_1 may be ¼ times the benchmark voltage AVDD, the reference voltage VREF2_2 may be 2/4 times the benchmark voltage AVDD, the reference voltage VREF2_3 may be ¾ times the benchmark voltage AVDD, and so on. Furthermore, the reference voltages output by the reference voltage generator 210 may not be limited to 4, and the number of reference voltages may be adjusted according to needs. Similarly, the switches in the switch circuit SEL of the voltage selector 220 may not be limited to 4, and the number of switches in the switch circuit SEL may be adjusted corresponding to the number of reference voltages.

Figure 3:
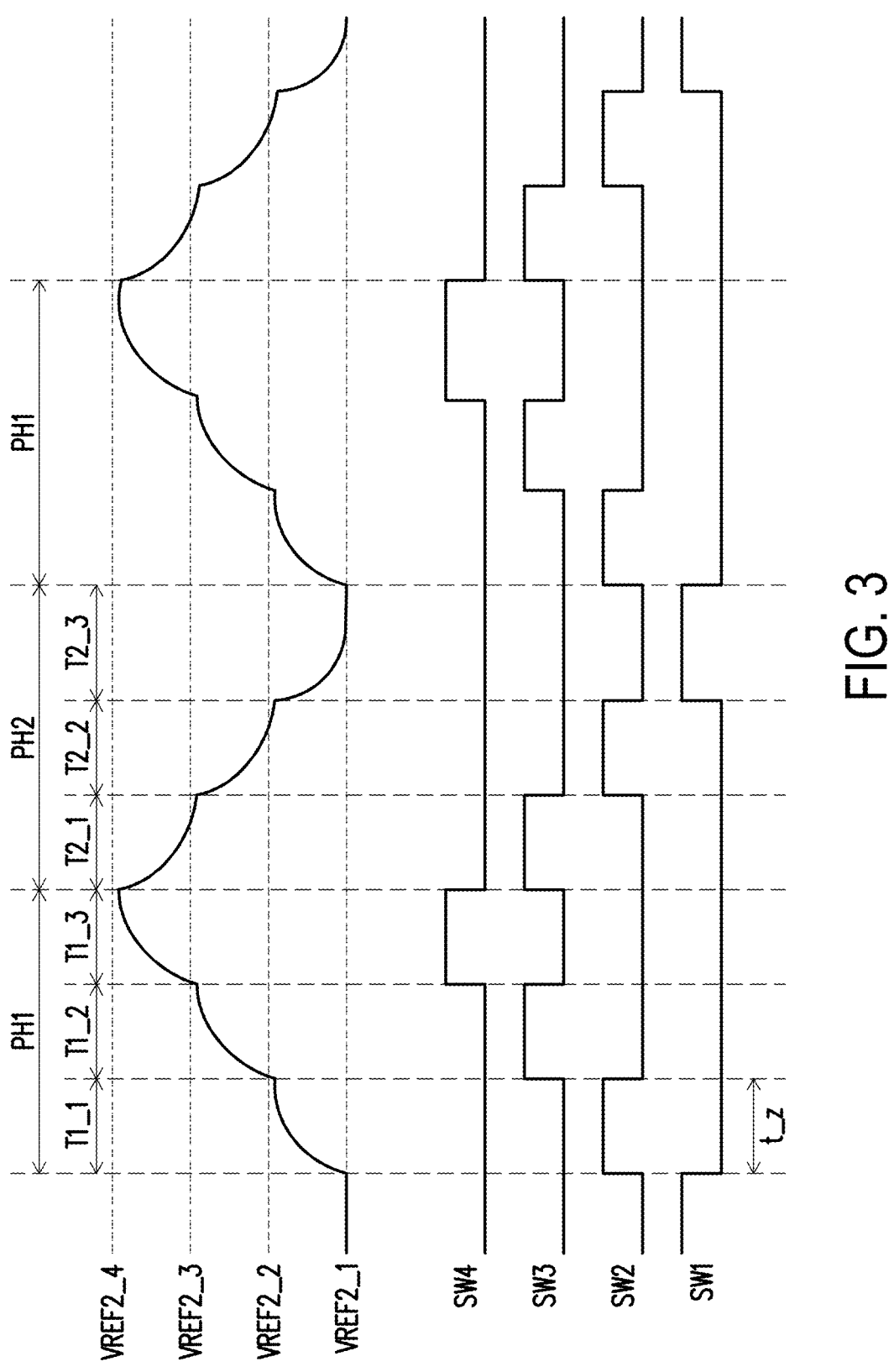
FIG. 3 illustrates an operation timing diagram of a voltage selector in FIG. 2.

Referring to FIG. 3, FIG. 3 illustrates an operation timing diagram of a voltage selector in FIG. 2. In FIG. 3, the time intervals in this example are divided into a first phase PH1 and a second phase PH2. The first phase PH1 has time intervals T1_1, T1_2, and T1_3. The second phase PH2 has time intervals T2_1, T2_2, and T2_3. The occurrence time of the first phase PH1 is before the occurrence time of the second phase PH2. Moreover, the time intervals T1_1, T1_2, and T1_3 and the time intervals T2_1, T2_2, and T2_3 all have a duration t_z.

Before entering the first phase PH1, the switch SW1 is conducted, while the other switches are disconnected, and the driving voltage VEN is set to the reference voltage VREF2_1.

In the first phase PH1, the driving device 200 may cause the touch panel TP to enter a charging phase, where the voltage value received by the touch panel TP gradually increases over time.

During the time interval T1_1, the switch SW2 is conducted, while the other switches SW1, SW3, and SW4 are disconnected, and the driving voltage VEN is increased from the reference voltage VREF2_1 to the reference voltage VREF2_2. During the time interval T1_2, the switch SW3 is conducted, while the other switches SW1, SW2, and SW4 are disconnected, and the driving voltage VEN is increased from the reference voltage VREF2_2 to the reference voltage VREF2_3. During the time interval T1_3, the switch SW4 is conducted, while the other switches SW1, SW2, and SW3 are disconnected, and the driving voltage VEN is increased from the reference voltage VREF2_3 to the reference voltage VREF2_4. Additionally, after the driving voltage VEN is increased to the reference voltage VREF2_4, the time T1_3 may be greater than T1_1 and T1_2 to maintain the voltage value of the driving voltage VEN.

In the second phase PH2, the driving device 200 may cause the touch panel TP to enter a discharging phase, where the voltage value received by the touch panel TP gradually decreases over time.

During the time interval T2_1, the switch SW3 is conducted, while the other switches SW1, SW2, and SW4 are disconnected, and the driving voltage VEN decreases from the reference voltage VREF2_4 to the reference voltage VREF2_3. During the time interval T2_2, the switch SW2 is conducted, while the other switches SW1, SW3, and SW4 are disconnected, and the driving voltage VEN decreases from the reference voltage VREF2_3 to the reference voltage VREF2_2. During the time interval T2_3, the switch SW1 is conducted, while the other switches SW2, SW3, and SW4 are disconnected, and the driving voltage VEN decreases from the reference voltage VREF2_2 to the reference voltage VREF2_1.

When the second phase PH2 ends, the driving device 200 may cause the touch panel TP to enter the first phase PH1 again, to perform charging once more.

It is worth noting that the rising voltage waveform of the driving voltage VEN in the first phase PH1 may be symmetrical to the falling voltage waveform of the driving voltage VEN in the second phase PH2.

Figure 4A:
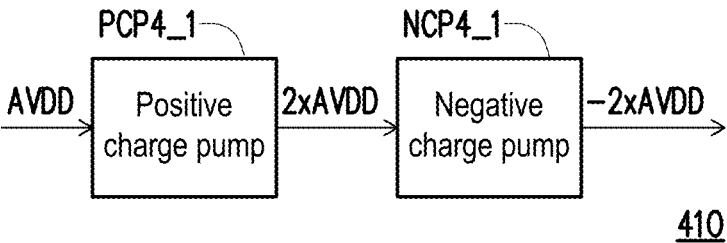
FIG. 4A illustrates a circuit diagram of a reference voltage selector of a driving device according to an embodiment of the disclosure.

Referring to FIG. 4A, FIG. 4A illustrates a circuit diagram of a reference voltage selector of a driving device according to an embodiment of the disclosure. The reference voltage generator 410 includes a positive charge pump PCP4_1 and a negative charge pump NCP4_1. The input terminal of the positive charge pump PCP4_1 receives a benchmark voltage AVDD. The output terminal of the positive charge pump PCP4_1 may output 2 times the benchmark voltage AVDD. The input terminal of the negative charge pump NCP4_1 is coupled to the output terminal of the positive charge pump PCP4_1, receiving the benchmark voltage AVDD. The output terminal of the negative charge pump NCP4_1 may output −2 times the benchmark voltage AVDD. The reference voltage generator 410 may provide the benchmark voltage AVDD, 2 times the benchmark voltage AVDD, and −2 times the benchmark voltage AVDD as reference voltages, respectively.

Figure 4B:
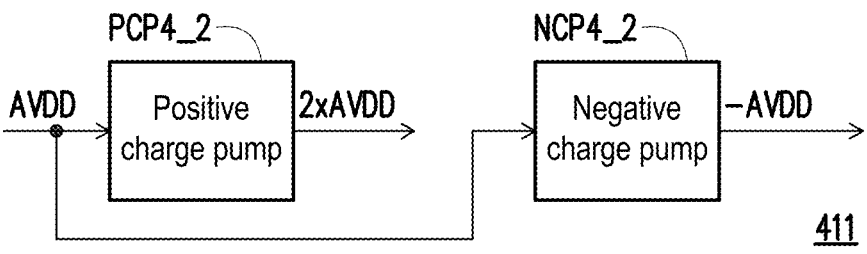
FIG. 4B illustrates a circuit diagram of a reference voltage selector of a driving device according to another embodiment of the disclosure.

Referring to FIG. 4B, FIG. 4B illustrates a circuit diagram of a reference voltage selector of a driving device according to another embodiment of the disclosure. A reference voltage generator 411 includes a positive charge pump PCP4_2 and a negative charge pump NCP4_2. The input terminal of the positive charge pump PCP4_2 receives a benchmark voltage AVDD. The output terminal of the positive charge pump PCP4_2 may output 2 times the benchmark voltage AVDD. The input terminal of the negative charge pump NCP4_2 receives the benchmark voltage AVDD. The output terminal of the negative charge pump NCP4_2 may output −1 time the benchmark voltage AVDD. The reference voltage generator 420 may provide the benchmark voltage AVDD, 2 times the benchmark voltage AVDD, and −1 time the benchmark voltage AVDD as reference voltages, respectively.

It is worth noting that the positive charge pumps PCP4_1 and PCP4_2 and the negative voltage pumps NCP4_1 and NCP4_2 may all be implemented by using charge pump circuits well-known to those skilled in the art, without specific limitations.

Figure 5:
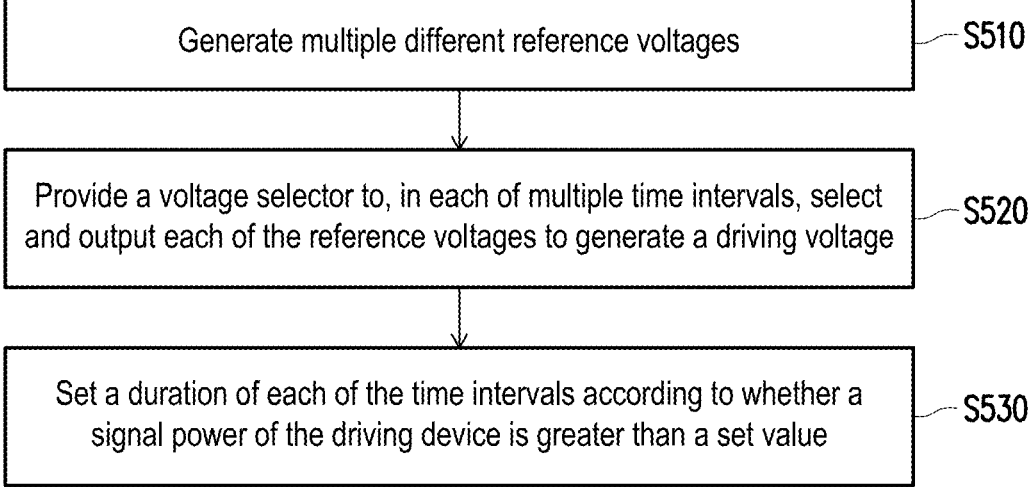
FIG. 5 illustrates a flowchart of a method for generating a driving voltage according to an embodiment of the disclosure.

Referring to FIG. 5, FIG. 5 illustrates a flowchart of a method for generating a driving voltage according to an embodiment of the disclosure. In step S510, this embodiment may generate the different reference voltages, and the reference voltages may be a sequence arranged in ascending order. In step S520, this embodiment may provide a voltage selector to select and output the reference voltages in each of the time intervals to generate the driving voltage. In step S530, this embodiment may set the duration of each of the time intervals according to whether the signal power of the driving device is greater than a set value.

Figure 6:
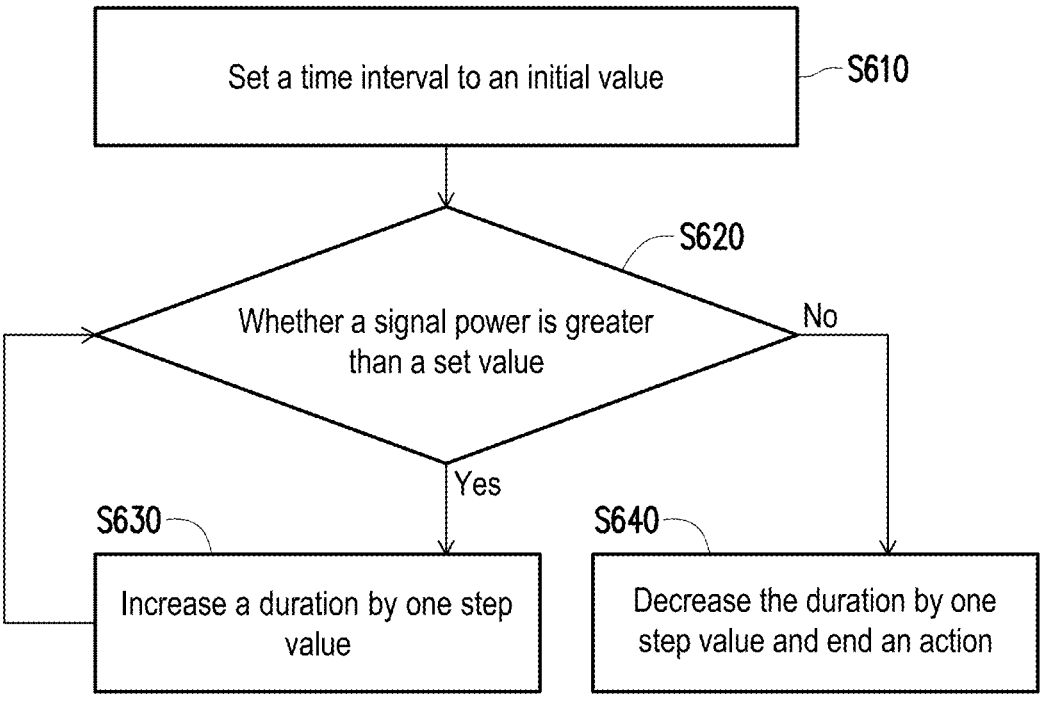
FIG. 6 illustrates a flowchart of a method for adjusting the duration of the method for generating in FIG. 5.

Referring to FIG. 6, FIG. 6 illustrates a flowchart of a method for adjusting the duration of the method for generating in FIG. 5. In step S610, the driving device may set the time interval to an initial value, and the initial value may be 0. In step S620, the driving device may perform a measurement action and determine whether the signal power is greater than a set value. If the determination is yes, the driving device may execute step S630. If the determination is no, the driving device may execute step S640.

In step S630, the driving device may increase the duration by one step value, and repeat step S620 to continue the measurement action until the signal power is less than the set value. In step S640, the driving device may decrease the duration by one step value and end the action. It is worth noting that the step value in this embodiment may be arbitrarily changed according to actual needs and is not limited to a specific value.

In summary, the driving device of the disclosure may output the reference voltages, and by uniformly adjusting the duration of each time interval of the voltage selector, the signal power and power consumption of the driving device can reach an optimal balance point when the touch panel is not fully charging or discharging, thereby simultaneously achieving the efficacy of noise immunity and reduced power consumption.

What is claimed is:

1. A method for generating a driving voltage, applicable to a driving device of a touch panel, comprising:
    generating a plurality of different reference voltages;
    providing a voltage selector to, in each of a plurality of time intervals, select and output each of the reference voltages to generate the driving voltage; and
    setting a duration of each of the time intervals according to whether a signal power of the driving device is greater than a set value,
    wherein in a first phase, a voltage value of the driving voltage increases sequentially in the corresponding time intervals, and in a second phase, the voltage value of the driving voltage decreases sequentially in the corresponding time intervals.

2. The method for generating the driving voltage according to claim 1, wherein a rising voltage waveform of the driving voltage in the first phase is symmetrical to a falling voltage waveform of the driving voltage in the second phase.

3. The method for generating the driving voltage according to claim 1, wherein the step of setting the duration of each of the time intervals according to whether the signal power of the driving device is greater than the set value further comprises:
    when the signal power is greater than or equal to the set value, the duration is increased by a step value; and
    when the signal power is less than the set value, the duration is decreased by the step value.

4. The method for generating the driving voltage according to claim 1, wherein the time intervals have the same duration.

5. The method for generating the driving voltage according to claim 1, wherein the step of generating the different reference voltages comprises:
    receiving a benchmark voltage, and performing voltage multiplication on the benchmark voltage to generate at least one adjusted voltage; and
    generating the reference voltages respectively according to the benchmark voltage, the at least one adjusted voltage, and a ground voltage.

6. The method for generating the driving voltage according to claim 1, wherein in each of the time intervals, the voltage value of the driving voltage is less than each of the reference voltages.

7. The method for generating the driving voltage according to claim 6, wherein in the first phase, when the driving voltage rises to the highest voltage value of the reference voltages, and maintains for a preset duration, the voltage value of the driving voltage is kept at the highest voltage value of the reference voltages, wherein the preset duration is greater than the duration of the time interval.

8. The method for generating the driving voltage according to claim 1, wherein in each of the time intervals, the voltage value of the driving voltage is at least 86% of each of the reference voltages.

9. A driving device, configured to drive a touch panel, comprising:
    a reference voltage generator, receiving a benchmark voltage, and providing a plurality of different reference voltages; and
    a voltage selector, coupled to the reference voltage generator, receiving the reference voltages, and in each of a plurality of time intervals, respectively selecting and outputting each of the reference voltages to generate a driving voltage,
    wherein the voltage selector sets a duration of each of the time intervals according to whether a signal power of the driving device is greater than a set value, and
    wherein in a first phase, the voltage value of the driving voltage increases sequentially in the corresponding time intervals, and in a second phase, the voltage value of the driving voltage decreases sequentially in the corresponding time intervals.

10. The driving device according to claim 9, wherein the rising voltage waveform of the driving voltage in the first phase is symmetrical to the falling voltage waveform of the driving voltage in the second phase.

11. The driving device according to claim 9, wherein the voltage selector comprises:
    a switch circuit, receiving the reference voltages; and
    a controller, coupled to and controlling the switch circuit, wherein when the signal power is greater than or equal to the set value, the controller increases the duration of each of the time intervals by a step value, and wherein when the signal power is less than the set value, the controller decreases the duration of each of the time intervals by a step value.

12. The driving device according to claim 9, wherein the time intervals have the same duration.

13. The driving device according to claim 9, wherein the reference voltage generator performs voltage multiplication on the benchmark voltage to generate at least one adjusted voltage, and generates the reference voltages respectively according to the benchmark voltage, the at least one adjusted voltage, and a ground voltage.

14. The driving device according to claim 9, wherein in each of the time intervals in the first phase, the voltage value of the driving voltage is less than each of the reference voltages.

15. The driving device according to claim 14, wherein in the first phase, when the voltage selector raises the driving voltage to the highest voltage value of the reference voltages, and maintains for a preset duration, the voltage value of the driving voltage is kept at the highest voltage value of the reference voltages, wherein the preset duration is greater than the duration of the time interval.

16. The driving device according to claim 9, wherein in each of the time intervals in the first phase, the voltage value of the driving voltage is at least 86% of each of the reference voltages.

* * * * *